United States Patent [19]

Fava et al.

[11] Patent Number: 5,167,019
[45] Date of Patent: Nov. 24, 1992

[54] APPARATUS AND METHOD FOR INTERCONNECTING A PLURALITY OF DEVICES TO A SINGLE NODE IN A NODE-LIMITED SERIAL DATA BUS COMPUTER NETWORK

[75] Inventors: Thomas F. Fava; Robert B. Holland, both of Colorado Springs; Joseph M. Keith, Manitou Springs, all of Colo.

[73] Assignee: Digital Equipment Corporation, Maynard, Mass.

[21] Appl. No.: 370,467

[22] Filed: Jun. 23, 1989

[51] Int. Cl.⁵ .................. G06F 13/00; G06F 13/36; H04L 12/28
[52] U.S. Cl. .................. 395/200; 364/284; 364/284.4; 364/242.94; 364/DIG. 1; 364/242.96; 364/240.1; 340/825.5; 370/85.1
[58] Field of Search ... 364/200 MS File, 900 MS File, 364/DIG. 1 MS File, DIG. 2 MS File; 340/825.03, 825.5, 825.51, 825.06; 370/58.1, 85.1; 395/200, 650, 725

[56] References Cited

U.S. PATENT DOCUMENTS

| | | | |
|---|---|---|---|
| 4,413,318 | 11/1983 | Herrington | 395/650 |
| 4,511,968 | 4/1985 | Fencsik et al. | 364/200 |
| 4,560,985 | 12/1985 | Strecker et al. | 340/825.5 |
| 4,719,569 | 1/1988 | Ludemann et al. | 364/200 |
| 4,777,595 | 10/1988 | Strecker et al. | 364/200 |
| 4,779,089 | 10/1988 | Theus | 340/825.5 |
| 4,779,190 | 10/1988 | O'Dell et al. | 364/200 |
| 4,780,821 | 10/1988 | Crossley | 395/650 |
| 4,800,488 | 1/1989 | Agrawal et al. | 364/200 |
| 4,961,224 | 10/1990 | Yung | 380/25 |
| 5,005,122 | 4/1991 | Griffin et al. | 395/200 |
| 5,043,938 | 8/1991 | Ebersole | 364/900 |
| 5,072,441 | 12/1991 | Szwarc | 370/60 |

Primary Examiner—Michael R. Fleming
Assistant Examiner—Gopal C. Ray
Attorney, Agent, or Firm—Arnold, White & Durkee

[57] ABSTRACT

A distributor apparatus and its method of operation for interconnecting a node of a bus in a node-limited serial data bus computer network to a plurality of subnode devices. A transmission on the bus is distributed or routed through the distributor to each subnode device connected thereto. A transmission from a subnode device is coupled to the bus through the distributor after the distributor selects one transmitting subnode device in the event that there are more than one subnode devices transmitting or requesting to transmit. Selection of one transmitting subnode device is carried out by rotating priority arbitration that occurs during an idle timing interval or quiet slot such that bus timing parameters are obeyed.

5 Claims, 4 Drawing Sheets

APPARATUS AND METHOD FOR INTERCONNECTING A PLURALITY OF DEVICES TO A SINGLE NODE IN A NODE-LIMITED SERIAL DATA BUS COMPUTER NETWORK

FIELD OF THE INVENTION

The invention relates generally to the field of computer system interconnections and, more particularly, to the method and apparatus for interconnecting a plurality of devices to a single node in a node-limited serial data bus computer network.

BACKGROUND OF THE INVENTION

Interconnection systems for a distributed computer network are well known in the field, one such interconnection system is described in the following patents: U.S. Pat. No. 4,450,572, titled INTERFACE FOR SERIAL DATA COMMUNICATIONS LINK, in the names of Robert E. Stewart, John E. Buzynski and Robert Giggi; U.S. Pat. No. 4,490,785, titled DUAL PATH BUS STRUCTURE FOR COMPUTER INTERCONNECTION, in the names of William D. Strecker, David Thompson and Richard Casabona; U.S. Pat. No. 4,560,985, titled DUAL-COUNT, ROUND-ROBIN DISTRIBUTED ARBITRATION TECHNIQUE FOR SERIAL BUSES, in the names of William D. Strecker, John E. Buzynski and David Thompson; U.S. Pat. No. 4,592,072, titled DECODER FOR SELFCLOCKING SERIAL DATA COMMUNICATIONS, in the name of Robert E. Stewart; and U.S. Pat. No. 4,777,595, titled APPARATUS FOR TRANSFERRING BLOCKS OF INFORMATION FROM ONE NODE IN A SECOND NODE IN A COMPUTER NETWORK, in the names of William D. Strecker, Robert E. Stewart and Samuel Fuller. The interconnection system described in the above referred to patents essentially comprises a bus having a limited number of nodes with virtual circuits established between the nodes which, at higher levels of protocol, appear to be bilateral connections between every pair of nodes in the network. Quantities of data commonly referred to as data packets are transmitted over the bus according to a time-multiplexing communication protocol.

Such interconnection systems provide a very effective means for networking all types and combinations of computer system elements, such as processors, disk drives and tape drives. Nevertheless, such interconnection systems also have a number of shortcomings or deficiencies. First, such interconnection systems have heretofore been implemented with a passive coupler that limits the number of nodes in the network and, thus, the number of computer system elements that are attachable to the network. The coupler commonly in use contains merely coupling transformers and requires no electrical power. Such an arrangement supports a high transmission speed in the range of about 70 million bits per second. However, signal attenuation becomes a limiting factor and accordingly restricts the number of nodes that can be connected to the network. An additional limitation on coupler size and the number of nodes arises due to the construction of a coupler that provides a communication path between a transmit path from each node and receive paths of all nodes. As the number of nodes is increased, the number of internal connections increases accordingly, and the practical size of a usable coupler is quickly limited. For at least the above reasons, the interconnection system size commonly in use today is effectively limited to about 32 nodes.

A second deficiency of the known interconnection systems lies in the manner in which devices in general and mass storage devices in particular are coupled to the network. Intermediate server devices have heretofore been used to interface with a node on the bus and provide access to the bus for a number of storage devices, such as disk or tape drives, connected to it. The server performs all bus transmit and receive functions on behalf of the storage devices connected to it. The server advantageously occupies only one node even though multiple devices can use it for access to the bus. An ancillary benefit of a server is that it reduces cabling since it can be located in or adjacent to a cabinet containing multiple storage devices so that only one set of bus cables, associated with the one node to which the server interfaces, must run to the area having the server and the storage devices. However, the server is expensive hardware, and it introduces a delay that impedes the performance of both the storage devices using it as well as the network as a whole. To reduce cost and improve speed by eliminating a server, it has heretofore been required to use one node for each device and accordingly run a set of cables to each individual device. The use of a server has thus been a suitable way to expand the number of devices effectively coupled to the node-limited network and minimize cabling, but it has drawbacks in terms of cost and diminished performance.

SUMMARY OF THE INVENTION

The present invention overcomes the foregoing and other shortcomings of interconnection systems heretofore used by providing a distributor that communicatively couples a plurality of computer system elements, such as processors and storage devices, to a single node in a node-limited network that includes a bus with a limited plurality of nodes.

As is well known in the field of computer interconnections, transfers from one node to another node in a computer network can be accomplished via a multiple access bus. In such an arrangement, each node has a transmit path and a receive path for respectively sending and receiving signals over the bus between itself and other nodes in the network. The distributor of the present invention is coupled to the bus and includes means for communicating with the bus, via a transmit path and receive path associated with a node on the bus. The distributor is further coupled to a plurality of computer system elements or devices, referred to as "subnodes" or "subnode devices", and includes means for communicating with such devices, via a subnode transmit path and a subnode receive path associated with each such device.

As described more fully hereinafter, the distributor interconnects a single node, referred to as a "distribution node", to a plurality of subnode devices and operates so that, at the virtual circuit level, all transmissions in the network directly involve the individual subnode devices and not the distributor itself. In this way, the distributor differs from an intermediate server device, even though, like a server, it physically occupies only one node. Additionally, the distributor can operate within the timing constraints that are normally associated with a multiple access bus, such as those required for "packetized" communications as described in U.S. Pat. No. 4,777,595 and distributed arbitration as described in U.S. Pat. No. 4,560,985. Thus, the distributor is invisible at the higher levels of protocol, such as the virtual circuit level, and only minimally extends transmission times.

The distributor monitors all transmissions in the network via its receive path from the bus. A receive circuit is provided for receiving such transmissions, referred to as "incoming signals". The receive circuit reconditions the incoming signals to remove jitter and distortion caused by transmission over the bus so that the incoming signals can be retransmitted to each subnode device via its subnode receive path. The receive circuit merely relays to the subnode devices the signals present on the bus; it does not perform any independent operation on those signals. Thus, the subnode devices receive bus signals delayed by only a short time that appears like, and is on the order of, the delay due to a slightly longer transmission cable.

Each subnode device, in turn, operates essentially as if it were connected directly to a node on the bus. Each subnode device receives transmission signals, determines whether the transmission is intended for it and responds to the sending node as is well known in the field and more fully described in U.S. Pat. No. 4,777,595. When a subnode transmits signals in response to a transmission intended for it, a multiplexer and a transmission circuit of the distributor cooperate to pass such signals to the bus via the transmit path of the distributor.

A subnode device desiring to transmit over the bus to another computer element in the network operates analogously to a device simply connected to a node on the bus, as is well known in the art and more completely described in U.S. Pat. No. 4,777,595 and U.S. Pat. No. 4,560,985. There are, however, significant differences that are necessary to ensure that the timing parameters of the bus are observed despite the fact that the subnode device must transmit through the distributor. One important difference is that each subnode device must operate slightly in advance of how it would operate if it were directly connected to the node without the distributor. In the preferred embodiment, each subnode device operates in advance of the timing that would be necessary if the device were directly connected to the node without the distributor. The amount of advance time operation of each subnode is less than the duration of one "quiet slot" in the overall interconnect system timing sequence which, in a distributed arbitration system, is a time interval during which transmission is anticipated but is not yet taking place. This allows time for multiple subnode devices connected to the distributor and wishing to transmit to communicate their desires to transmit to the distributor so that the distributor can arbitrate among them, selecting one to be allowed to use distributor and its node on the bus. In essence, during one quiet slot in advance of the slot during which the distributor will be given an opportunity to transmit, each subnode device wishing to use that slot to transmit asserts a carrier on its subnode transmit path. The distributor, using a rotating priority arbitration scheme, selects one requesting device and configures the multiplexer to allow that device's subnode transmit path to be coupled to the bus. The selected device is then active on the bus during the distributor's "active slot", which, in a distributed arbitration system is a time interval during which a device at a particular node is transmitting.

The distributor of the present invention overcomes the inherent limitation on the number of nodes of a bus, operates within previously defined critical timing parameters, minimizes hardware cost and transmission times and simplifies cabling requirements of a computer network.

DETAILED DESCRIPTION

Figure 1:
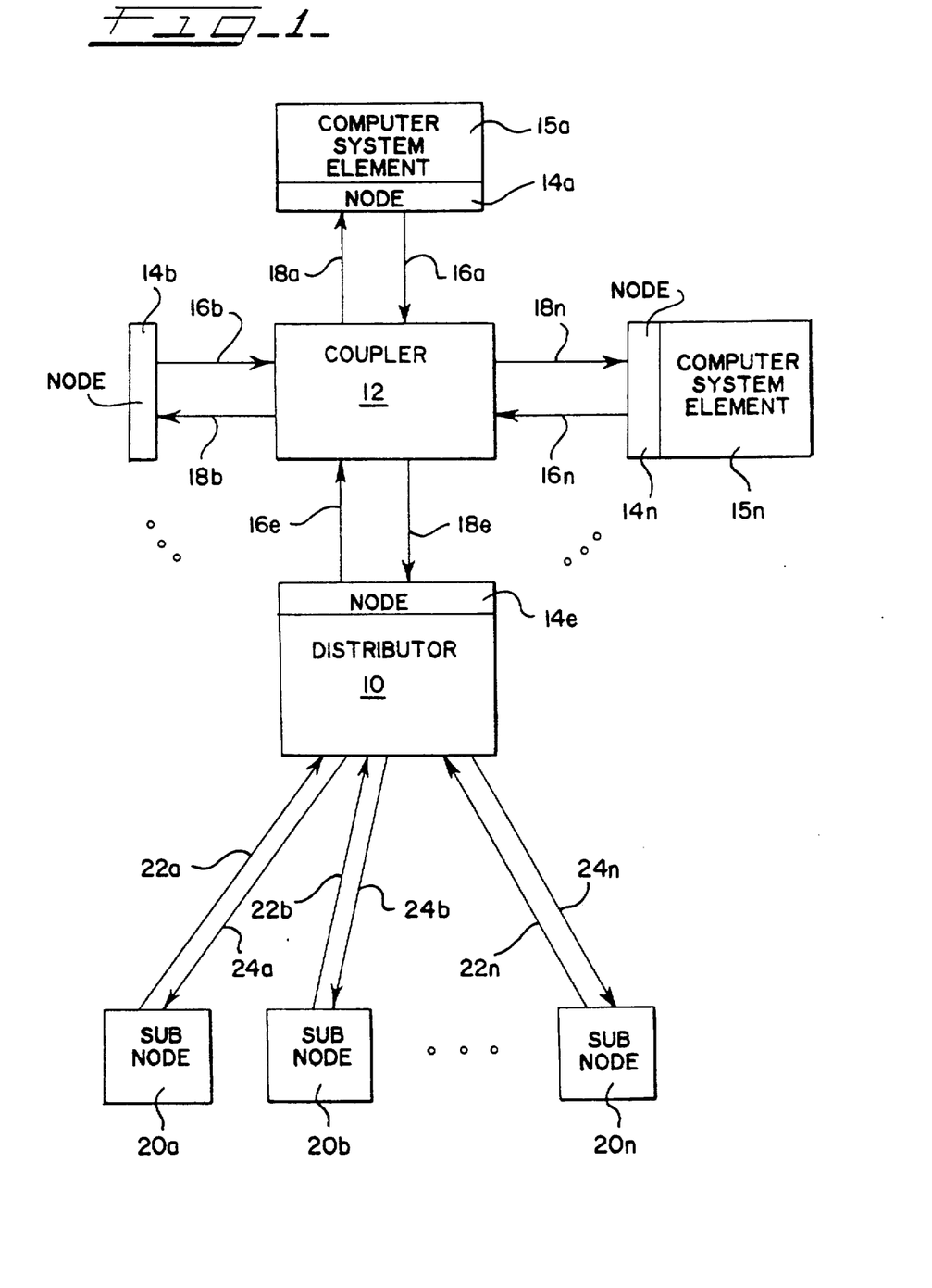
FIG. 1 is a block diagram of an exemplary computer interconnection network using the present invention.

FIG. 1 shows a simplified network in which the distributor 10 of the present invention is used. A coupler 12, as is well known in the field, provides all interconnections between a plurality of nodes 14a through 14n and, together with such interconnections, is referred to as a "bus." Each node 14a through 14n is connected to the coupler 12 via a respective node transmit path 16a through 16n and a node receive path 18a through 18n. Each node can be occupied by a computer system element or device, 15a through 15n, as is well known. Distributor 10 physically occupies a node, such as node 14e, on the bus in the same manner as any other computer system element would occupy such a node. There are two sets of paths 16, 18 to each node 14, and the bus structure is well known in the field such as that shown in U.S. Pat. No. 4,490,785. The network shown in FIG. 1 is simplified in that it only shows four nodes 14a, 14b, 14e and 14n and one distributor 10 located at node 14e, and it should be understood that a coupler 12 is adapted to accommodate any reasonable but limited number of nodes 14, and any number of such nodes 14 may be occupied by a distributor 10.

As a computer system element occupying a node 14e on the bus, distributor 10 is connected to coupler 12, and therefore is coupled to the bus, via a node transmit path 16e and a node receive path 18e. Each subnode device 20a through 20n is coupled to distributor 10 in a like manner via a subnode transmit path 22a through 22n and a subnode receive path 24a through 24n. Each subnode device 20 is similar in construction and operation to a device that could be suitably connected directly to a node 14 of the bus. Subnode devices 20 may be disk drives, tape drives, processors or any computer system element and may be used in any suitable combination.

Figure 2:
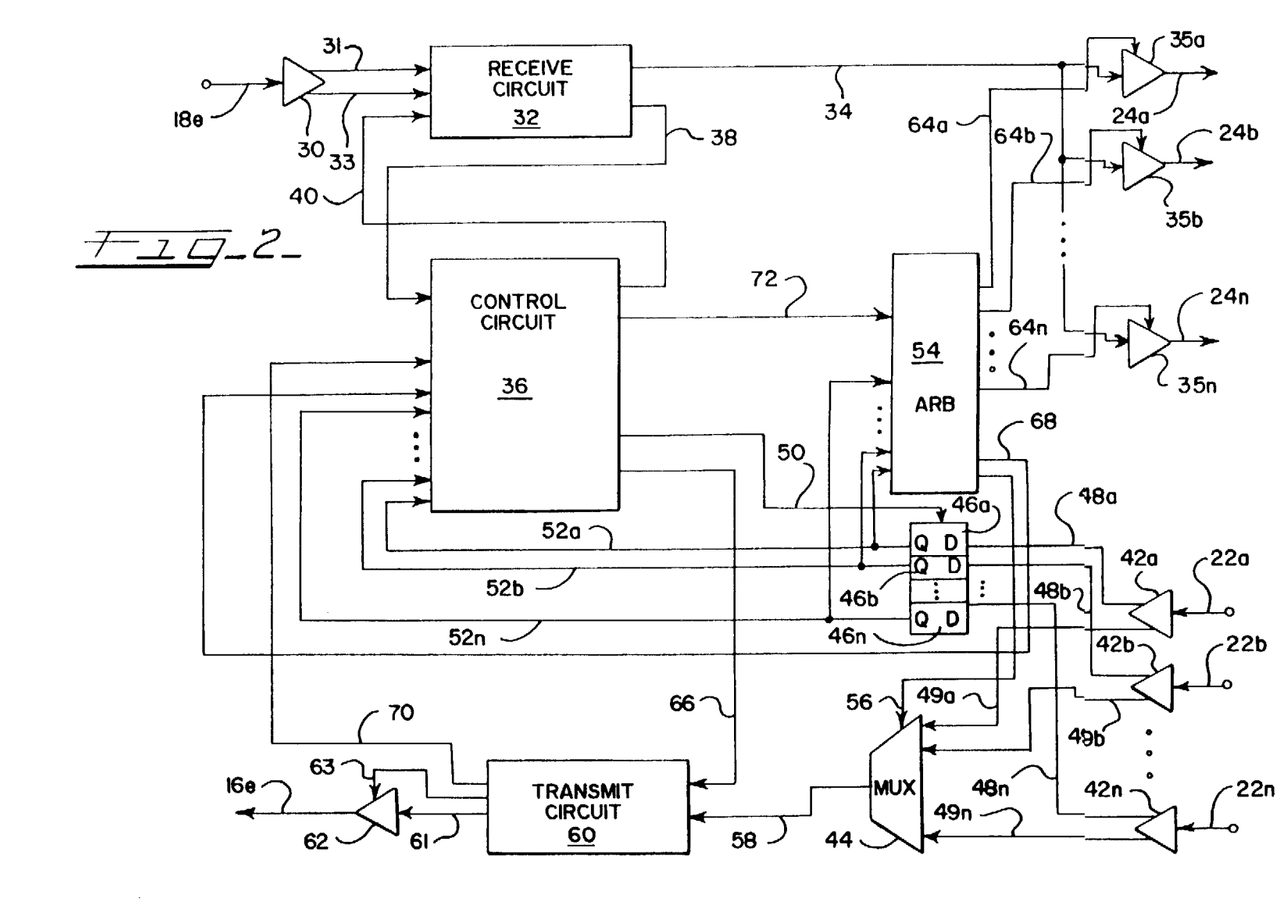
FIG. 2 is a block diagram of the distributor of the present invention.

Referring now to FIG. 2, a block diagram of a distributor 10 is shown. Node receive path 18e is input to buffer 30. Serial data from the bus is provided by buffer 30 to receive circuit 32 via line 31. Buffer 30 further provides receive circuit 32 with a signal on line 33 indicating the presence of a carrier on the bus. Receive circuit 32 receives incoming signals present on receive path 18e, such as signals transmitted over the bus by another device or computer system element in the network. As is well known in the field, receive circuit 32 reconditions and resynchronizes the incoming signals to remove jitter and distortion caused by transmission over the bus and then retransmits or connects the incoming signals on line 34 and through buffers 35 for eventual reception by each subnode device 20a through 20n via its respective subnode receive path 24a through 24n.

As is also well known, receive circuit 32 monitors node receive path 18e, via line 33, for the presence of a carrier on the bus. Such a carrier would be present if a computer system element in the network were actively transmitting over the bus. Information relating to the presence of a carrier is transferred from receive circuit 32 to control circuit 36 via line 38. Control circuit 36, in performing all control tasks of distributor 10, provides necessary timing signals and diagnostic signals to receive circuit 32 via line 40.

Subnode transmit paths 22a through 22n are input to buffers 42a through 42n respectively. Serial data from the subnode devices is applied to a multiplexer 44 via lines 49a through 49n from buffers 42a through 42n. Buffers 42a through 42n further provide signals, indicating the presence of carriers from the respective subnode devices, to D flip-flops 46a through 46n, via lines 48a through 48n. Multiplexer 44 is a 1-of-N multiplexer where N is the number of subnode devices 20 that are connectable to distributor 10. The number of D flip-flops is also N, such that each line 48a through 48n corresponding to a particular subnode device 20a through 20n is coupled to a "D" input of a flip-flop 46a through 46n. In the preferred embodiment, 16 subnode devices are connected to distributor 10, in which case multiplexer 44 could be a 1-of-16 multiplexer and D flip-flops 46 could comprise 16 individual D flip-flops, commonly clocked by a clock signal from control circuit 36 on line 50. Of course, fewer or more than 16 subnode devices could be used and the number of related circuit elements would correspondingly change.

Each subnode device 20 requesting to transmit over the bus asserts a carrier signal, and each signal is respectively present on lines 52a through 52n from the output of D flip-flops 46a through 46n. Subnode carrier information is provided via lines 52a through 52n to control circuit 36 and an arbitration circuit 54. Control circuit 36 uses such subnode carrier information in controlling the distributor 10 as hereinafter described, and arbitration circuit 54 uses such carrier information to select a particular subnode device 20a through 20n which will be permitted by the distributor 10 to transmit over the bus during the next transmission interval reserved for the node 14e which the distributor 10 occupies.

The function and operation of arbitration circuit 54 will be understood by considering the technique by which subnode arbitration is carried out. Each subnode device 20 is assigned a unique number or "address" that, in conjunction with the address of the node that the distributor occupies, is used by a transmitting element in the network to identify the particular device in the network that is the intended recipient of a transmitted message. Arbitration circuit 54 stores the number of the subnode device that was most recently permitted to transmit over the bus, and gives that subnode device lowest priority should it subsequently request to transmit again. The next highest numbered subnode device, in a circularly recurring sequence, that is currently requesting to transmit will be given access to the bus. In other words, subnode arbitration is carried out by arbitration circuit 54 according to a rotating priority technique which is well known in the field. Subnode carrier information on lines 52a through 52n is used by arbitration circuit 54 to determine which particular subnode devices are currently requesting permission to transmit.

It is significant to the present invention that the arbitration process above described be carried out during a quiet slot preceding the slot during which the distributor 10 would be given access to the bus. During such a quiet slot, the bus is quiet and all devices on the bus are counting quiet slots according to a distributed arbitration technique that is well known and described in U.S. Pat. No. 4,560,985. The subnode arbitration process described above will ensure that there will be adequate time to configure multiplexer 44 via line 56 so as to couple the selected subnode device, such as subnode device 20b, via its subnode transmit path 22b to node transmit path 16e via line 58, transmit circuit 60, line 61 and buffer 62. An enable signal on line 63 is precisely controlled by transmit circuit 60 so that transmissions onto the bus via node transmit path 16e are governed to ensure that all bus timing parameters are obeyed. Also, a grant pulse is transmitted by arbitration circuit 54 to the selected subnode device via line 64b, buffer 35b and subnode receive path 24b informing the selected subnode device that it has won the arbitration and will be transmitting onto the bus.

As is well known, transmit circuit 60 performs a reconditioning of subnode transmit signals in a manner similar to that performed by receive circuit 32 on incoming signals from node receive path 18e. Timing signals for this purpose are provided to transmit circuit 60 by control circuit 36 via line 66. Information concerning the existence of a requesting subnode is made available to control circuit 36 from arbitration circuit 54 via line 68. As is well known, diagnostics and transmission timing information is made available to control circuit 36 from transmit circuit 60 via line 70. Control circuit 36 controls arbitration circuit 54 and the grant pulse which is sent to a selected subnode device via line 72.

Figure 3A:
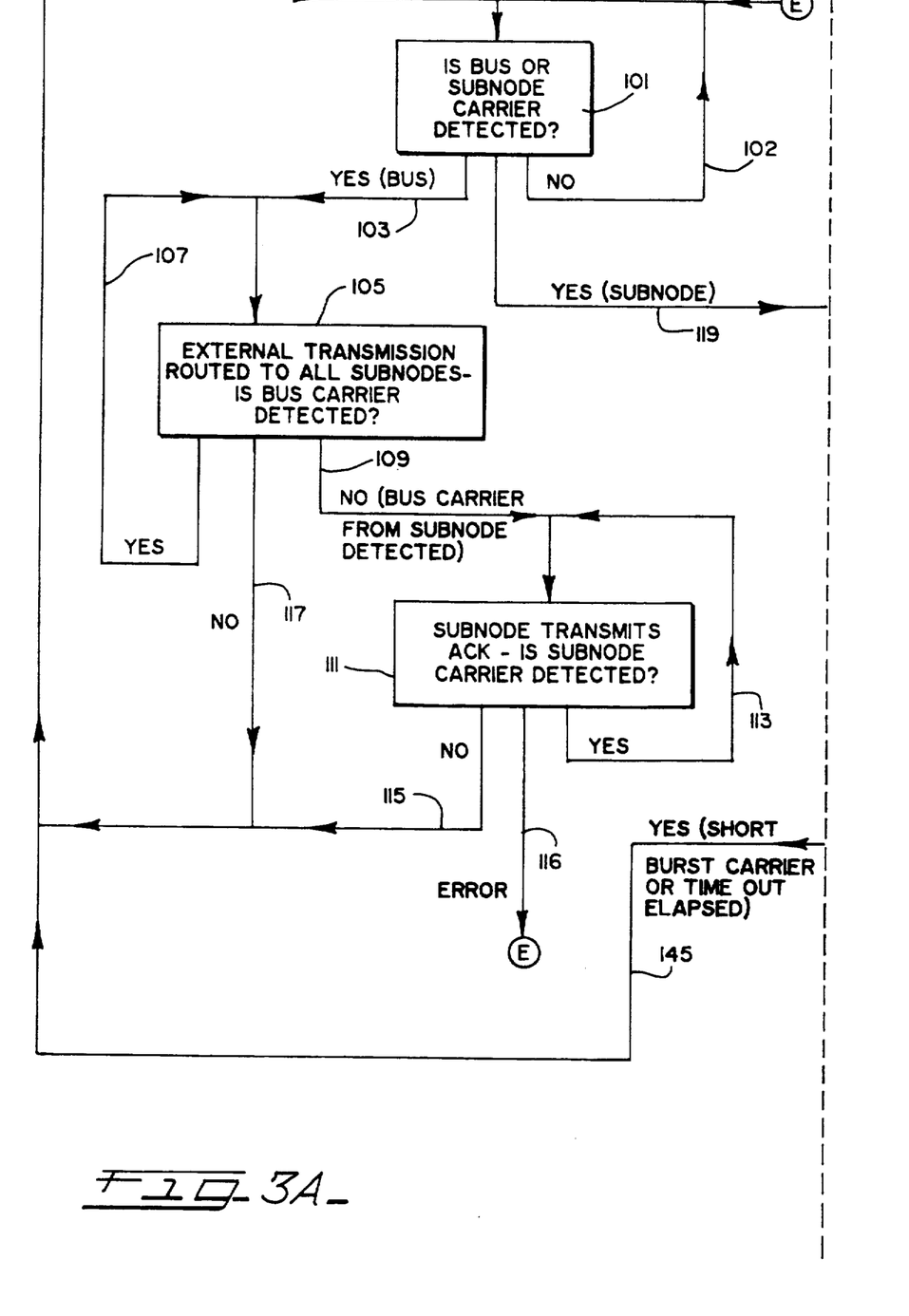
FIG. 3 is a state diagram illustrating the operation of the distributor of the present invention.
Figure 3B:
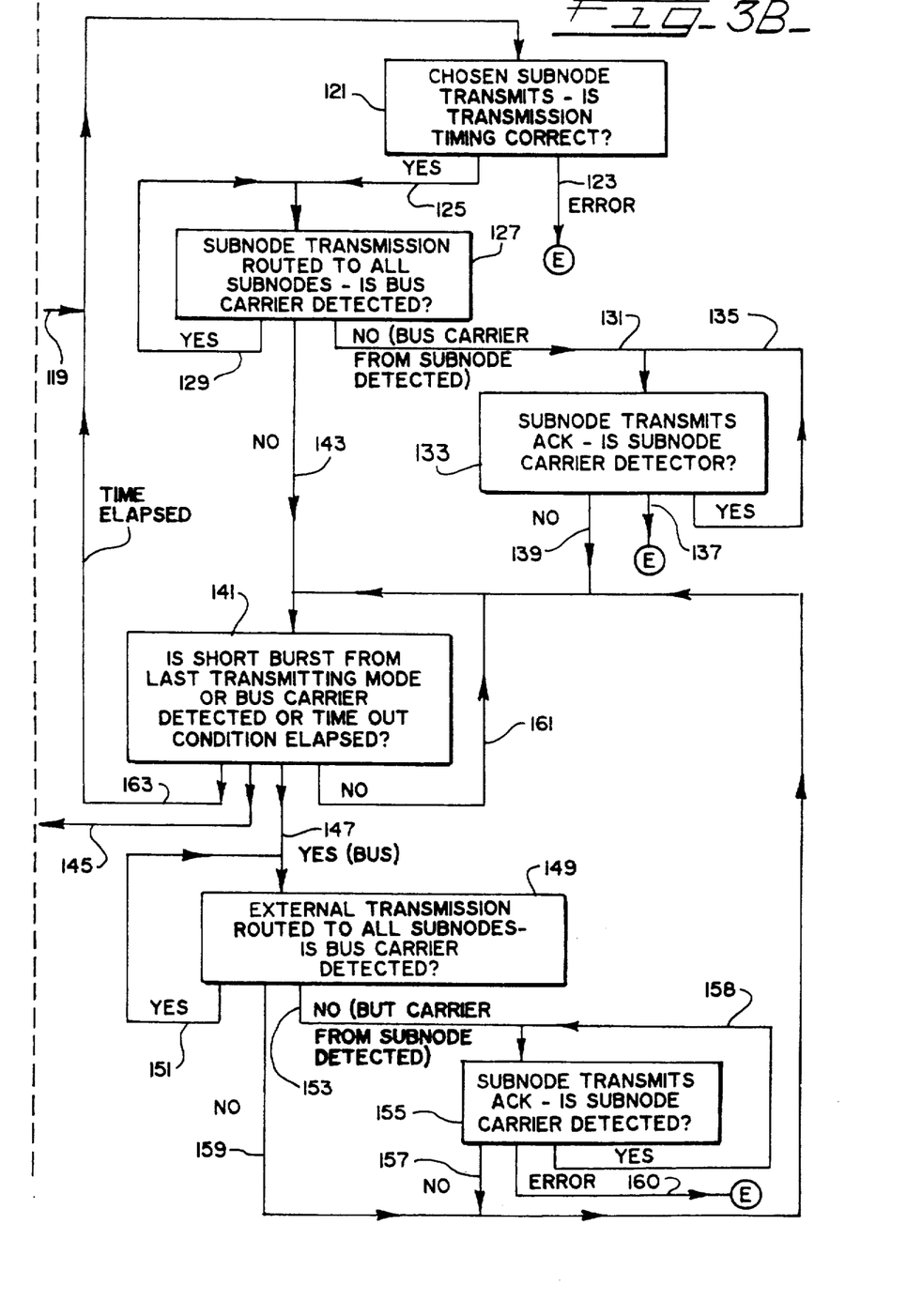

The detailed operation of distributor 10 is best understood by considering the state machine of control circuit 36 which is shown in FIG. 3. FIG. 3 illustrates the flow of control at the data link layer, which is a higher level than the physical layer but lower than the virtual circuit layer. All functions of the distributor 10 are at the physical and data link layers, making the distributor 10 completely invisible at the virtual circuit layer. For purposes of discussion, consider the distributor to be in a state 101, where the system monitors the bus for a carrier asserted by an element in the network and also monitors the subnode devices for a carrier asserted by any one or more of them. As long as no carrier is detected, either from the bus or from the subnode devices, control remains in state 101 via transition 102.

In the event that a carrier is detected on the bus, control passes via transition 103 to state 105. This occurs when an element of the network, external to the distributor's subnode devices, begins to transmit over the bus. At such time, the external transmission must be routed to the subnode devices, any one of which may be the intended recipient. In state 105, the system continues to monitor the bus and the subnode devices for a carrier. As long as the bus carrier remains, the external transmission is continuing and control remains in state 105 via transition 107. Alternatively, because the length of time needed to transmit a data packet is a known quantity, a counter (not illustrated) may be employed, and, as long as the data packet transmission time has not expired, control will remain in state 105 via transition 107.

When the external transmission is completed and the bus carrier disappears, or the data packet transmission time has expired, one of two possibilities occurs. If the transmission were intended for one of the distributor's subnodes and it were properly received, the recipient responds to the transmitting element with an acknowledgment signal or packet known as an ACK, as is well known and described in U.S. Pat. No. 4,777,595. To accomplish this, the recipient subnode device asserts its carrier to transmit, as is well known and described in U.S. Pat. No. 4,777,595. Thus, in this case, if while at state 105, the bus carrier disappears, or the packet transmission time expires, and a subnode device carrier is asserted, control passes via transition 109 to state 111. Upon passing to state 111, a counter (not shown) is reset. The counter is used as a time out in the event that the transmission of the ACK packet exceeds the time slot reserved for it.

In state 111, the distributor 10 sends a grant pulse to the message recipient that has requested to respond with an ACK packet, and it configures the multiplexer so that the recipient subnode device can transmit its ACK packet through the distributor and onto the bus. As long as that subnode device's carrier remains asserted, or, alternatively, as long as the packet transmission time has not expired, control remains in state 111 via transition 113. When the recipient subnode device's carrier disappears, or, alternatively, when the transmission time for its ACK packet has expired, control passes via transition 115 back to state 101. If the transmission of the ACK packet exceeds its time slot, as indicated by a time out condition of the counter referred to above, or if the subnode device's carrier prematurely disappears, an error condition exists and control passes via transition 116 back to state 101 and suitable error flags are set.

If, at state 105, the external transmission has been completed, as indicated either by the external bus carrier disappearing or the packet transmission time expiring, and no subnode device's carrier has been asserted, control passes via transition 117 to state 101. This would occur in the event that the external transmission were not intended to be received by any of the subnode devices connected to the distributor.

While, at state 101, a carrier asserted by a subnode device is detected, and it is time for the distributor's node to be active on the bus, that is, the distributor has successfully arbitrated for the bus in response to a transmission request by a subnode device, as is well known and described in U.S. Pat. No. 4,560,985, describing an arbitration technique used by devices on nodes of the bus, control passes via transition 119 to state 121. As described above, however, before this time, the arbitration circuit of the distributor has already chosen a subnode device to be permitted to transmit in the event that there are multiple subnode devices requesting to transmit during the interval reserved for the node to which the distributor is connected. At state 121, a grant pulse is sent to the chosen subnode device and the multiplexer is configured to permit the chosen subnode device to transmit through the distributor and onto the bus. A first counter (not shown) is reset upon passing via transition 119 to state 121 that is used to create a time out in the event that the subnode device transmission exceeds the packet transmission time reserved for it, and a second counter (not shown) is also reset. The second counter will be used to provide a time out in the event that, after repeated tries, a packet transmission is not being recognized by the intended recipient.

In the event that the transmission has exceeded the time allotted, as indicated by time out condition of the first counter, or if the transmitting subnode device's carrier prematurely disappears, an error condition exists, control passes via transition 123 to state 101 and appropriate error flags are set. When an error during transmission exists, such as just described, or when a subnode device is sending an ACK packet, it is important to exit the transmission state as soon as possible so that other unrelated bus communications in the network are not disturbed. If the transmission occurs without error such that the packet transmission time expires at the time that the transmitting subnode device's carrier disappears, control passes via transition 125 to state 127.

It should be understood that, because of the nearly passive, or "unintelligent" operation of the distributor, and in particular the receive circuit and associated paths, a transmission that goes out onto the bus from one subnode comes back via node receive path 18 and is routed to all subnodes, including the transmitting subnode, via the subnode receive paths 24. This attribute is needed because one subnode device might be the intended recipient of a transmission of another subnode device connected to the same distributor. The above-described condition is checked for in state 127.

Control remains in state 127 via transition 129 as long as a carrier is detected on the bus. That is, even though the transmitting subnode has ceased the transmission, delays caused by transmission over cable could cause the transmission to continue to be received for a significant time after transmission actually ceases. When the bus carrier finally disappears and a subnode device is indeed the intended recipient, because it asserts its carrier wishing to send an ACK packet, control passes via transition 131 to state 133. The functions performed at state 133 are the same as those performed at state 111, described above. And, similarly, upon transition to state 133 a counter (not shown) is reset for purposes of later providing a transmission time out in the event of an error. As long as the recipient subnode device has its carrier asserted, or, alternatively, as long as the ACK packet transmission time has not been exceeded, control remains in state 133 via transition 135.

If the transmission of the ACK packet exceeds its transmission time, as indicated by a time out condition of the counter, or if the subnode device's carrier prematurely disappears, an error condition exists and control passes via transition 137 to state 101 and appropriate error flags are set. If the transmission of the ACK packet is completed without error, as indicated by the subnode device's carrier disappearing when the ACK packet transmission time expires, control passes via transition 139 to state 141. Control passes directly to state 141 from state 127, via transition 143 in the event that the bus carrier disappears and no subnode device's carrier is asserted, that is, in the event that the transmission is received and no subnode device wishes to send an ACK packet, such as when the message is intended for some other element in the network.

At state 141, the system looks for a short burst of carrier from the subnode device that was permitted to transmit on the bus. The short burst of carrier indicates to the distributor that a valid ACK or NAK packet was received by the transmitting subnode device and thus the transmission was recognized by the intended recipient. A NAK packet as described in U.S. Pat. No. 4,777,595 is a "negative acknowledgment" that is similar to an ACK packet in that it indicates that the transmission was recognized by the intended recipient but it further indicates that the transmission needs to be repeated. In the event that a short burst is made, or in the event of the failure of the transmitting subnode device to get an ACK or a NAK packet after repeated re-tries of the transmission, as indicated by a time out condition of the second counter referred to above, control passes via transition 145 to state 101. State 141 is very similar to state 101, except that, instead of monitoring all subnode devices for an asserted carrier, only a request to transmit from the subnode device that last transmitted is effective. That subnode device is permitted to exhaust a limited number of transmission re-tries in order to receive an ACK or a NAK packet indicating that the recipient recognized the transmission. These re-tries must take place in subsequent normally arbitrated time slots allotted to the node to which the distributor is connected.

In the meantime, however, the bus carrier may become asserted by another external element in the network that is beginning to transmit. In this case, the distributor must route the external transmission to all subnodes, and control passes via transition 147 to state 149. In state 149, like state 105, the system monitors the bus and all of the subnode devices for a carrier. As long as the bus carrier remains, or, alternatively, as long as the packet transmission time has not expired, the external transmission is continuing, and control remains in state 149 via transition 151.

In the event that the external transmission was intended for a subnode device, that subnode device asserts its carrier, and its transmission will be coupled to the bus when the bus carrier disappears, or, alternatively, when the packet transmission time expires. This causes control to pass via transition 153 to state 155. The functions performed at state 155 and the transitions from state 155 are identical to those performed at state 111, described above, except that when the ACK packet has been properly completed as indicated by the ACK packet transmission time expiring when the recipient subnode device's carrier disappears, control passes via transition 157 to state 141. Control similarly passes to state 141 via transition 159 from state 149 when the bus carrier disappears and no subnode device is asserting its carrier. Transition 158 returning to state 155 is the same as transition 113 which returns to state 111, and transition 160 is the same as transition 116, both referred to above.

Returning now to state 141, the subnode device that most recently transmitted over the bus during state 121 is waiting for an ACK packet or a NAK packet from its intended recipient. Control remains in state 141 via transition 161 as long as that subnode device's carrier is not asserted (i.e., it is listening) and no other external element is asserting a carrier on the bus. If there is no external bus carrier and it is again time for the node to which the distributor is connected to have access to the bus, the waiting subnode device is permitted to re-try its transmission. In this event, control passes via transition 163 to state 121. The second counter, referred to above, provides a time out that limits the number of re-tries so that, after repeated failure to receive an ACK packet or a NAK packet, control nevertheless passes back to state 101 via transition 145.

The above illustrative embodiment depicts a circuit arrangement for interconnecting a single node, in a node-limited computer network, to a plurality of subnode devices. It can be used in any network having a multiple access bus in which a distributed arbitration technique is employed. Each component of the system being exemplary, the scope of the invention is not intended to be limited to the specific embodiments shown or described. Instead, the scope of the invention is intended to encompass those modifications and variations that may be apparent to those persons skilled in the art to which the subject matter pertains.

What is claimed is:

1. A distributor for use in a node limited communication network having a plurality of communicating nodes interconnected over a common bus, each of said nodes being connected to said common bus by a node transmit path and a node receive path, each of said nodes having a different active slot time interval to begin transmission onto said bus, a plurality of communicating subnodes, each of said subnodes being connected to said distributor by a subnode transmit path and a subnode receive path, said distributor being connected to one of said nodes for interconnecting said plurality of subnodes to said common bus, said distributor comprising:

means for receiving incoming signals sent over said bus by one of said plurality of communicating nodes;

means for relaying said incoming signals to each of said plurality of communicating subnodes over said subnode receive path of each of said subnodes;

detecting means connected to each one of said subnode transmit paths for determining when one or more of said subnodes asserts a carrier on its respective subnode transmit path indicating that said subnode wants to transmit on said bus;

means for selecting, during a quiet slot time interval which precedes said active slot time interval of said node to which said distributor is connected, one of said subnodes to transmit onto said bus when more than one of said subnodes are asserting a carrier on their respective subnode transmit paths at the same time;

means for receiving a transmission from said selected subnode over its respective subnode transmit path; and means for relaying said received transmission from said selected subnode onto said bus beginning at said active slot time interval of said node to which said distributor is connected.

2. The distributor as set forth in claim 1 wherein said means for receiving incoming signals further comprises:

means for detecting if another one of said plurality of communicating nodes begins transmitting onto said common bus during said quiet slot time interval of said node to which said distributor is connected and, if so, preventing any of said subnodes from transmitting onto said common bus thereby assuring that two of said nodes do not simultaneously transmit onto said bus.

3. The distributor as set forth in claim 1 wherein said selecting means comprises means for carrying out a rotating priority arbitration between said subnodes asserting a carrier on their respective subnode transmit path.

4. A method of communicating over a common bus between one of a plurality of communicating nodes in a node limited network and one of a plurality of communicating subnodes, each of said nodes being connected to said common bus by a node transmit path and a node receive path, each of said subnodes being connected to a distributor by a subnode transmit path and a subnode receive path, said distributor being connected to one of said nodes for interconnecting said plurality of subnodes to said common bus, each of said nodes having a different active slot time interval to begin transmission onto said bus, said method comprising:

receiving incoming signals at said distributor sent over said common bus by one of said plurality of communicating nodes;

relaying said incoming signals to each of said plurality of communicating subnodes over said subnode receive path of each of said subnodes;

determining when one or more of said plurality of subnodes asserts a carrier on its respective subnode transmit path indicating that said subnode wants to transmit onto said bus;

selecting, during a quiet slot time interval which precedes said active slot time interval of said node to which said distributor is connected, one of said plurality of subnodes to transmit onto said bus when more than one of said subnodes are asserting a carrier on their respective subnode transmit paths at the same time;

receiving at said distributor a transmission from said selected subnode over its respective subnode transmit path; and relaying said received transmission from said selected subnode onto said bus beginning at said active slot time interval of said node to which said distributor is connected.

5. The method of communicating as set forth in claim 4, further comprising the steps of:

determining if one of said plurality of communicating nodes begins transmitting onto said bus during said quiet slot time interval of said node to which said distributor is connected; and preventing any of said subnodes from transmitting when one of said plurality of nodes begins transmitting onto said bus during said quiet slot time interval; and enabling said transmission onto said bus from said selected subnode when one of said plurality of nodes is not transmitting onto said bus during said quiet slot time interval.

* * * * *